United States Patent [19]

DuVernay et al.

[11] Patent Number: 5,692,738
[45] Date of Patent: Dec. 2, 1997

[54] WORK FIXTURE BRAKE

[75] Inventors: Daniel J. DuVernay, Algonac; Brad L. Sieman, Goodells, both of Mich.

[73] Assignee: Auto-Craft Tool & Die, Algonac, Mich.

[21] Appl. No.: 639,657

[22] Filed: Apr. 29, 1996

[51] Int. Cl.$^6$ .................................................. B23Q 1/25
[52] U.S. Cl. ........................... 269/82; 269/232; 188/72.7
[58] Field of Search ....................... 269/71, 72, 73, 269/74, 82, 83, 84, 232, 235, 236, 254 R; 188/17, 71.1, 72.1, 72.7, 72.9, 166

[56] References Cited

U.S. PATENT DOCUMENTS

| | | | |
|---|---|---|---|
| 2,251,016 | 7/1941 | Gallimore | 269/232 |
| 2,470,487 | 5/1949 | Hollis . | |
| 2,636,409 | 4/1953 | Milus | 269/232 |
| 2,991,994 | 7/1961 | Kulp . | |
| 3,194,349 | 7/1965 | Kershner et al. | 188/72.7 |
| 4,036,329 | 7/1977 | Anderson | 188/72.7 |
| 4,691,904 | 9/1987 | Armstrong . | |
| 5,156,382 | 10/1992 | Saeda et al. . | |

FOREIGN PATENT DOCUMENTS

| | | | |
|---|---|---|---|
| 1553950 | 12/1967 | France | 188/72.9 |
| 1215536 | 4/1966 | Germany | 188/72.9 |

*Primary Examiner*—Robert C. Watson
*Assistant Examiner*—Thomas W. Lynch
*Attorney, Agent, or Firm*—Dykema Gossett PLLC

[57] ABSTRACT

A work fixture brake includes a first block and a second block and a brake disc. The first block has a first axis of rotation passing therethrough and a first friction pad fixed thereto. The second block is axially juxtaposed the first block and is pivotably connected thereto at a second axis of rotation offset from the first axis of rotation. A second friction pad is rotatively fixed to the second block. A brake disc has a first side facing the first friction pad and an oppositely disposed second side facing the second friction pad. The brake disc is approximately centered on the first axis of rotations. Means for axially separating the first block from the second block are disposed therebetween. The means are responsive to a rotative force against the second block in a direction which would induce rotation about the first axis of rotation. The means thereby axially separates the first friction pad and the second friction pad, in turn releasing the brake disc.

10 Claims, 4 Drawing Sheets

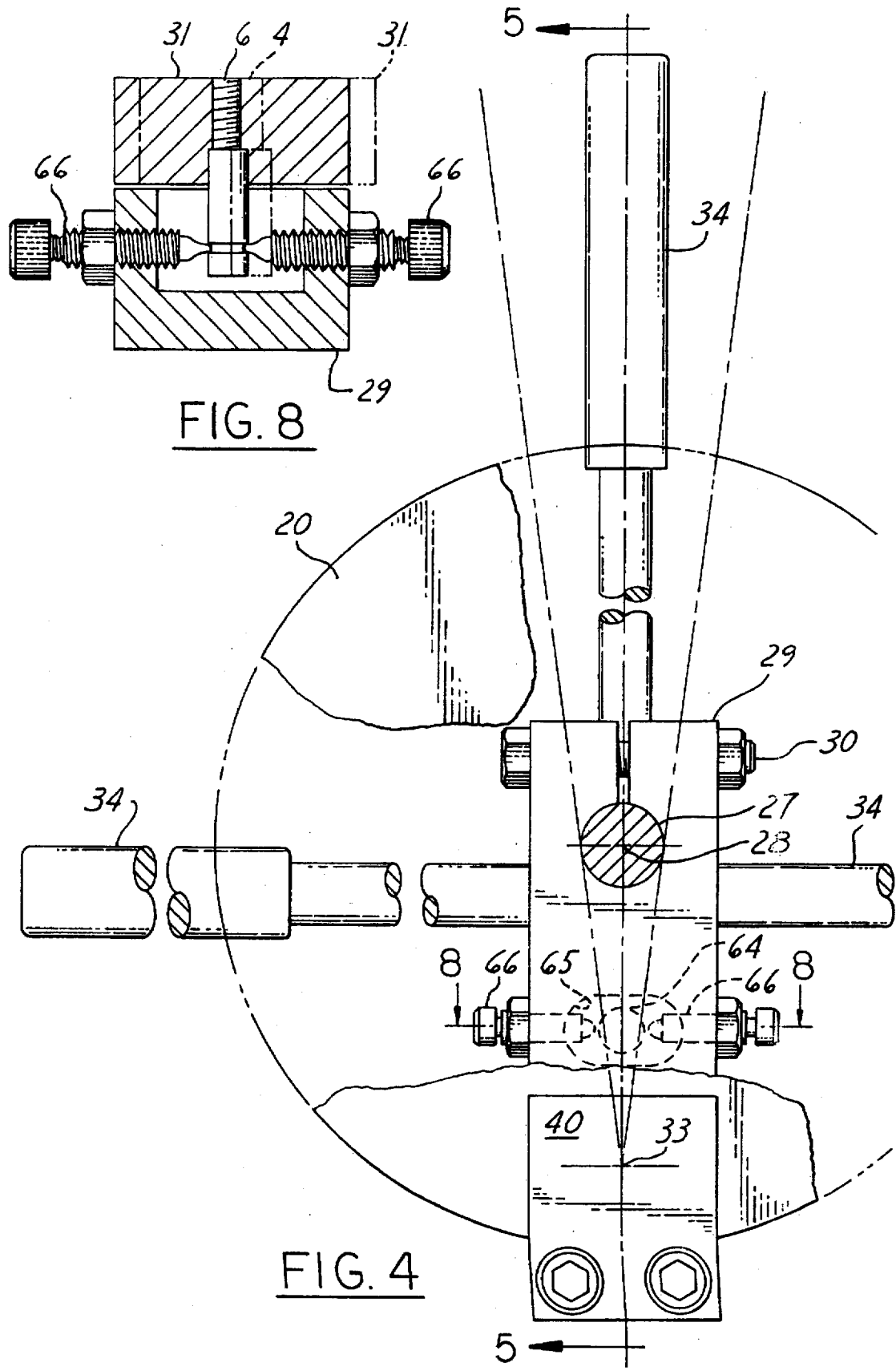

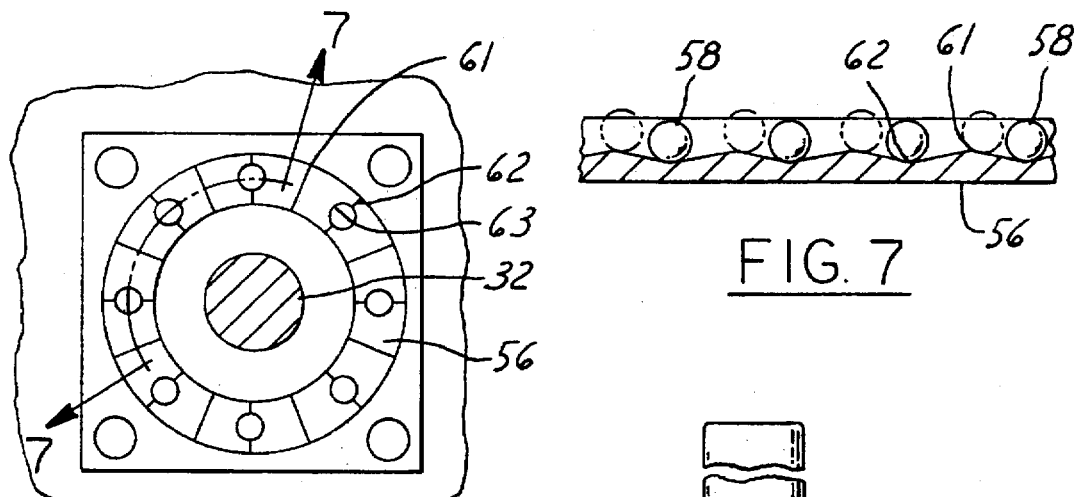
FIG. 6
FIG. 7
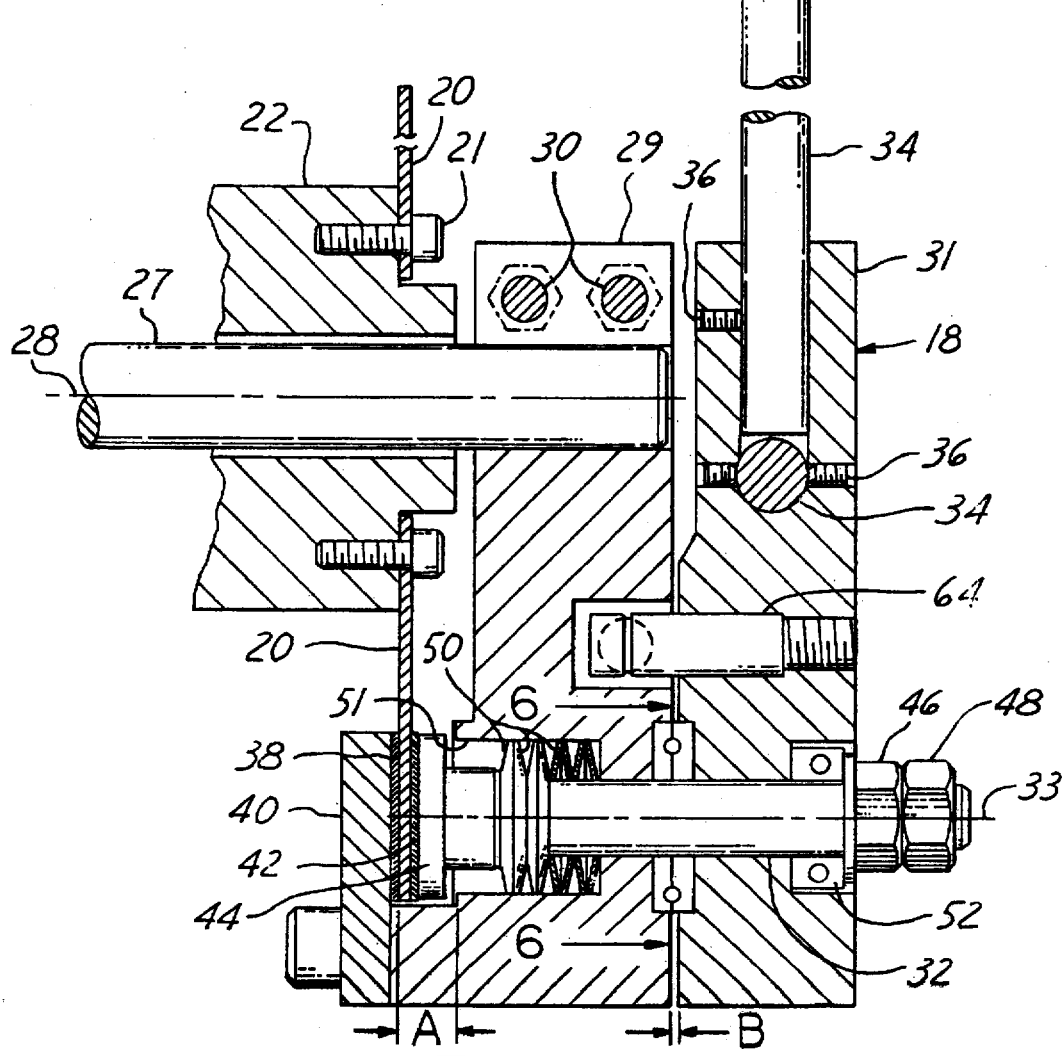
FIG. 5

WORK FIXTURE BRAKE

FIELD OF THE INVENTION

This invention relates to work holding fixtures, and more particularly to fixture brakes for rotatably positioning a work piece.

BACKGROUND OF THE INVENTION

When assembling certain large work pieces, it is highly desirable to have a fixture facilitating rotation of the work piece to desired angular positions. Motor vehicle instrument panels (IPs), for example, need to be worked on from both a front side which is normally presented to the vehicle operator and a back side which is normally hidden from view once the IP is installed.

Known work holding fixtures used with IPs provide the desired rotation of the IP about a lateral axis. A fixture brake is used to hold the IP in the desired angular position. Known fixture brakes take a variety of forms. One is similar to a motor vehicle disc brake in that it employs a fixed or non-rotating brake caliper mounted to the fixture frame in combination with a brake disc rotatably fixed to the work piece. The brake caliper mechanism is actuated by selectively applying fluid pressure to engage the disc, thereby locking the IP in place. One must release the pressure and index the IP to the desired position, and then restore the pressure, thereby reapplying the brake, to lock the IP in a new position.

The principle disadvantages of the fluid brake mechanism are related to the use of hydraulic fluid. The hydraulic fluid presents the possibility of fluid leakage on the work piece, environmental concerns relating to hydraulic fluid, and the need to periodically refill the system with hydraulic fluid to replace any which may have leaked out.

It is therefore desired to provide an alternative brake system of simple design which does not employ hydraulic fluid.

SUMMARY OF THE INVENTION

A work fixture brake includes a first block and a second block and a brake disc. The first block has a first axis of rotation passing therethrough and a first friction pad fixed thereto. The second block is axially juxtaposed the first block and is pivotably connected thereto at a second axis of rotation offset from the first axis of rotation. A second friction pad is rotatively fixed to the second block. A brake disc has a first side facing the first friction pad and an oppositely disposed second side facing the second friction pad. The brake disc is approximately centered on the first axis of rotations. Means for axially separating the first block from the second block are disposed therebetween. The means are responsive to a rotative force against the second block in a direction which would induce rotation about the first axis of rotation. The means thereby axially separates the first friction pad and the second friction pad, in turn releasing the brake disc.

An advantage of the disclosed work fixture brake is the combination of its simplicity of operation and the lack of need for hydraulic fluid.

BRIEF DESCRIPTION OF THE DRAWINGS

FIG. 4 is an end view of the fixture brake in the direction of arrow 4 of FIG. 3.

FIG. 5 is a sectional view of the fixture brake taken in the direction of arrows 5 of FIG. 4.

FIG. 6 is an end view of a broken out portion of the fixture shown in the direction of arrows 6 of FIG. 5.

FIG. 7 is a partial sectional view of the cam of FIG. 6 shown in the direction of arrows 7.

FIG. 8 is a sectional view of the fixture brake shown in the direction of arrows 8 of FIG. 4.

DESCRIPTION OF A PREFERRED EMBODIMENT

Figure 1:
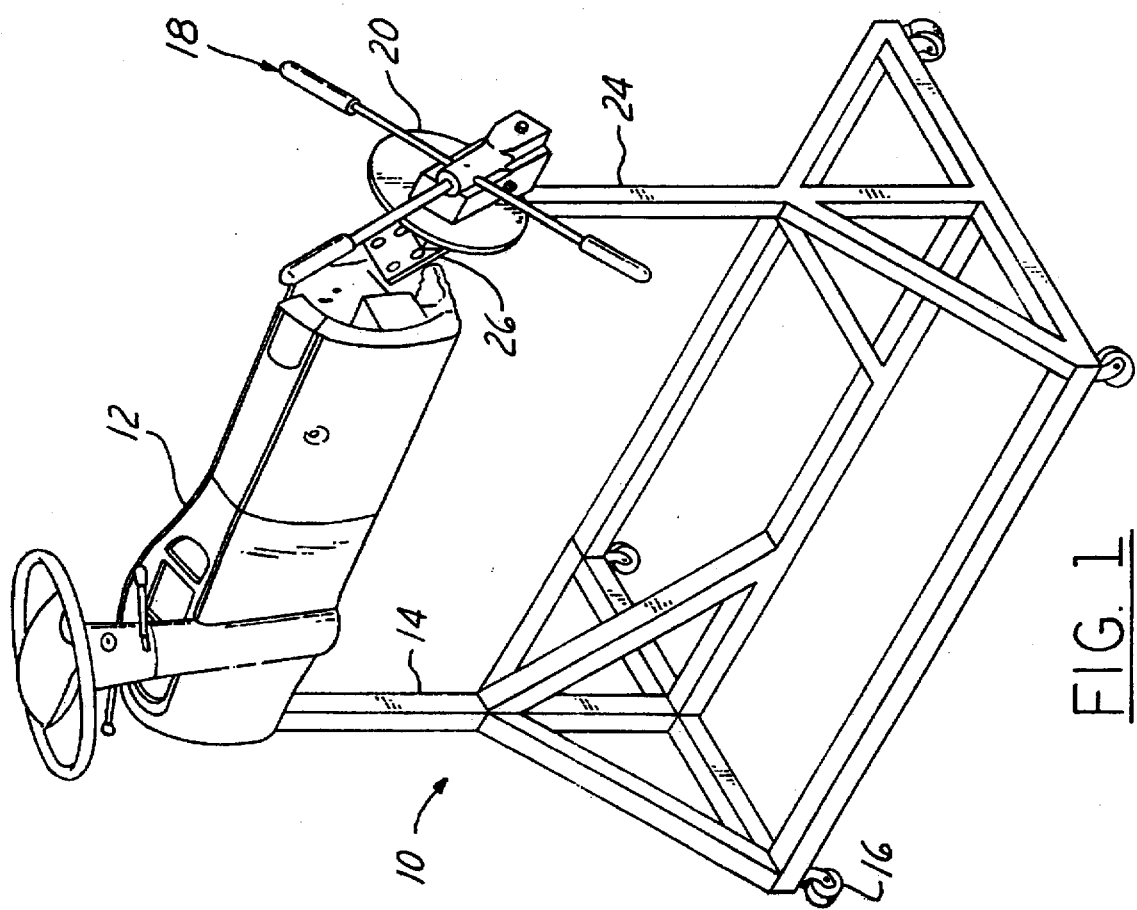
FIG. 1 is a perspective view of a work fixture employing the inventive fixture brake having an exemplary work piece mounted thereto.

A work fixture 10, as shown in FIG. 1, supports an exemplary work piece, an instrument panel 12. The work fixture includes a support frame 14 and casters 16. Alternatively, support frame 14 could be configured to be suspended from an overhead conveyor instead of the caster supported configuration shown.

A fixture brake 18 is mounted to the fight hand side of support frame 14 and is connected with work piece 12 for the purpose of controlling the angular position of instrument panel 12. A left hand side of instrument panel 12 is supported by a freely rotating bearing (not shown).

Fixture brake 18 includes a brake disc 20. As shown in FIG. 5, brake disc 20 is fixed by mounting screws 21 to a hub 22 which, as best seen in FIG. 3, is fixed to frame upright 24, thereby fixing brake disc 20 relative to support frame 14.

Figure 2:
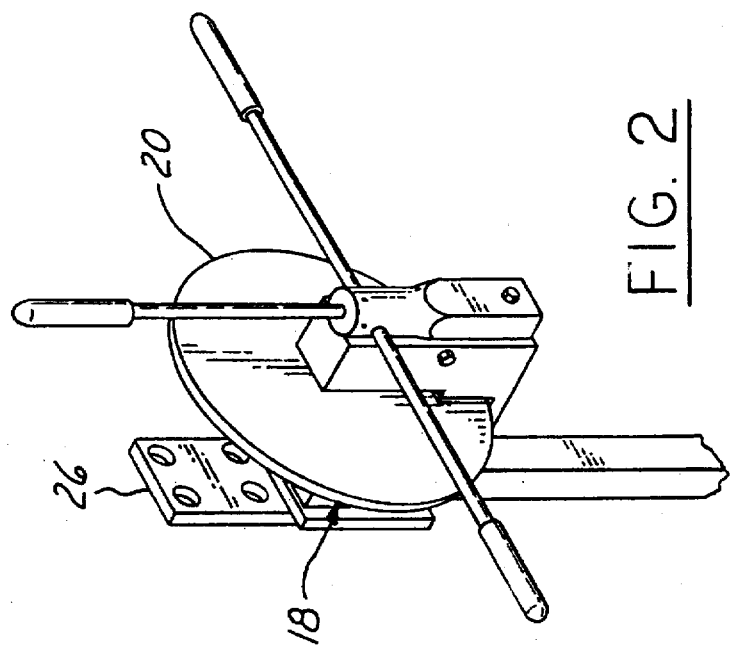
FIG. 2 is an enlarged perspective view of the fixture brake of FIG. 1.
Figure 3:
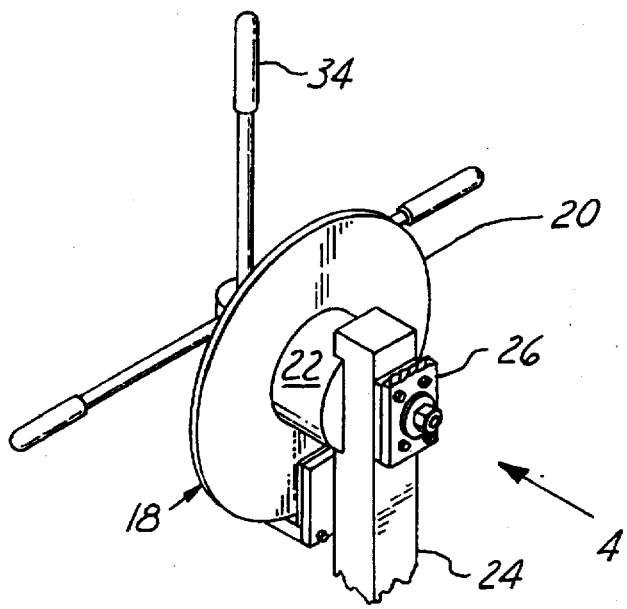
FIG. 3 is a perspective view of the fixture brake of FIG. 2 shown from the opposite side.
Figure 9:
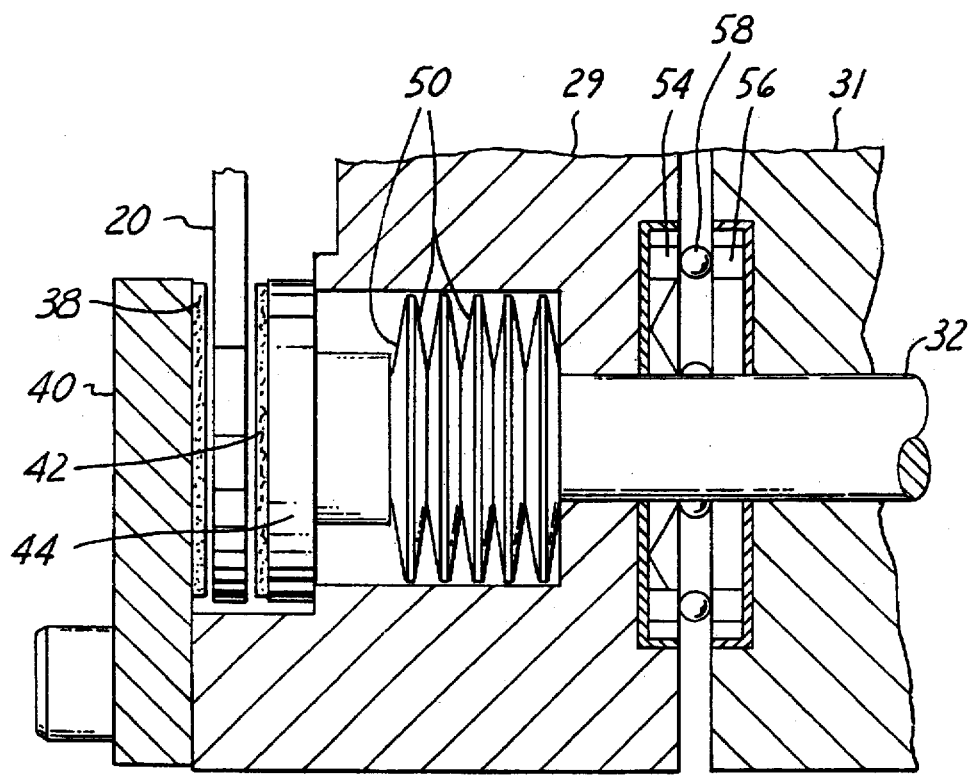
FIG. 9 is an enlarged broken out section of the fixture brake in the direction of arrows 5 of FIG. 4 highlighting the interface between the brake friction pads and the brake disc.

A work piece mounting flange 26, shown in FIGS. 1, 2 and 3, are fixed to a rotating shaft 27, shown in FIG. 5, extending from fixture brake 18.

Rotating shaft 27 is centered on a first axis of rotation 28 which passes through the left hand support bearing and about which instrument panel 12 is rotated. A first block 29 is fixed to rotating shaft 27 by the clamping action induced by clamping fasteners 30 which draw together a split end of first block 29.

First block 29 and a second block 31 are pivotably attached to each other by a pivot shaft 32 at a second axis of rotation 33 offset from first axis of rotation 28. Operation of fixture brake 18 is enhanced if axis 33 is substantially parallel to axis 28.

Three handles 34 are each disposed in bores in the second block 31 and are fixed therein by set screws 36.

A first friction pad 38 is fixed to a first friction pad backing plate 40, mounted to an axial extension of first block 29 to define a gap A between first friction pad 38 and the rest of first block 29. Gap A receives brake disc 20. A second friction pad 42 is fixed to second friction pad backing plate 44 which is in turn fixed to pivot shaft 32 and is located within gap A, opposite the first friction pad 38, and on a second side of brake disc 20.

A positioning nut 46 disposed on a threaded end of pivot shaft 32 limits the axial travel of pivot shaft 32 and therefore second friction pad 42 toward brake disc 20 and first friction pad 38. A locking nut 48 tightened against positioning nut 46 fixes positioning nut 46 in place on pivot shaft 32. Eight diaphragm springs 50 are disposed over pivot shaft 32 between second friction pad 42 and first block 29, thereby biasing second friction pad 42 toward brake disc 20. Springs 50 are located within a cavity 51 in first block 29 which opens toward gap A. A thrust bearing 52 is disposed between positioning nut 46 and second block 31 to sustain the axial loads induced by diaphragm springs 50 and to enable relative rotation between second block 31 and positioning nut 46.

A first clutch cam 54, as shown in FIGS. 6 and 7, is centered on second axis 36 and is fixed to first block 29 facing second block 31. An identical second clutch cam 56 is also centered on second axis 36 is fixed to second block 31, facing first clutch cam 54. Eight spherical cam rollers 58 are disposed between first and second clutch cams 54 and 56. Both cams 54 and 56 have eight equally spaced cam peaks on a predetermined diameter and eight equally spaced cam valleys disposed midway between the peaks. Circular roller seats 63 centered in each of the cam valleys 62. The combination of the clutch cams 54 and 56 and the cam rollers 58 define an axially gap B between first block 29 and second block 31. Gap B is at a minimum when cam valleys 62 and 63 are aligned and cam rollers 58 are disposed in their respective seats. Gap B is at a maximum when cam peaks 60 are aligned with cam valleys 62.

A centering pin 64 is fixed to second block 31 midway between first axis 28 and second axis 33 in parallel therewith, and extends into a recess 65 in first block 29. A pair of spring loaded piston assemblies 66 are disposed, one on each side of pin 64, and engaging a detent groove 68 in centering pin 64 to bias centering pin 64, and therewith, second block 31 to a centered position with respect to first block 29.

The inventive fixture brake 18 operates in the following manner. A work piece or instrument panel is first mounted in work fixture 10 such that its rotational center of gravity is approximately aligned with the first axis of rotation 28. The instrument panel is rotatably supported on the left hand side and is fixed to mounting flange 26 on the right hand side. In its static position, fixture brake 18 maintains the instrument panel in its rotative position. Diaphragm springs 50 bias second backing plate 44 and second friction pad 42 against disc 20. First friction pad 38 and first friction pad backing plate 40 resist any deflection of brake disc 20, enabling brake 20 to be clamped between the two friction pads. Cam valleys 62 are aligned with axial gap B resultantly at a minimum.

To rotate instrument panel in a desired direction, at least one of the handles 34 is gripped by an operator and rotated in the desired direction. Fixture brake 18 initially remains engaged. As handle 34 is rotated, second block 31 begins to rotate relative to first block 29 as the force of spring loaded piston 66 is overcome. With relative rotation between first and second blocks 29 and 31, first and second clutch cams 54 and 56 are correspondingly indexed with respect to each other, thereby increasing axial gap B. Axial gap B increases with second block 31 moving away from first block 29.

Pivot shaft 32 and second friction pad 42 moves with second block 31, thereby releasing disc 20. Once disc 20 has been released, first block 29 and shaft 27 are able to rotate with second block 31 and handle 34 about the first axis of rotation 28, resultantly rotating instrument panel 12 in the desired direction of rotation. When the desired orientation is achieved, handle 34 is quickly released. Once released, piston assemblies 66 return second block 31 to a centered position with respect to first block 29, thereby returning gap B to its minimum, with friction pads 38 and 42 once again engaging disc 20 and holding instrument panel 12 in a fixed position.

Preferred embodiments of the invention have been disclosed, however, it should be appreciated that alternative embodiments would be readily apparent to one skilled in the art of work fixtures. For example, alternative spring configurations may be substituted for diaphragm springs 50. Additionally, the location of centering pin 64 could be moved to a location opposite second axis 33 from first axis 28. It may also be desirable in some cases to vary the cam profiles shown. Further, the members can be affixed to one another by means other than those shown in the disclosed embodiment. For example, disc 20 could be welded to hub 22. It should therefore be appreciated that the true scope of this invention is defined by the following claims.

We claim:

1. A work fixture brake comprising:
    a first block having a first axis of rotation passing therethrough and having a first friction pad rotatively fixed thereto;
    a second block axially juxtaposed the first block and pivotably connected thereto at a second axis of rotation which is substantially parallel to and offset from the first axis of rotation and the second block having a second friction pad rotatively fixed thereto;
    a brake disc having a first side facing the first friction pad and an oppositely disposed second side facing the second friction pad and being approximately centered on the first axis of rotation; and
    means for axially separating the first block from the second block disposed therebetween and the means being responsive to a rotative force against the second block in a direction inducing rotation about the second axis of rotation thereby axially displacing the second friction pad away from the first friction pad and thereby releasing the brake disc.

2. A work fixture brake as described in claim 1 wherein a centering mechanism tending to bias the first and second blocks to a predetermined relative rotative position is disposed therebetween.

3. A work fixture brake as described in claim 2 wherein one of the first block and the second block includes a centering pin oriented substantially parallel to the second axis of rotation and offset therefrom and the other of the first block and the second block includes a pair of spring loaded pistons engaging the pin on opposite sides thereof with the pins being oriented to restore the second block to the predetermined relative rotative position.

4. A work fixture block as described in claim 1 wherein the second block is disposed opposite the disc from the first block and an extension of the first block extends axially past the disc with the first friction pad fixed thereto and the disc being disposed in a gap between the first block and the first friction pad.

5. A work fixture brake as described in claim 4 wherein a pivot shaft disposed on the second axis of rotation is fixed to the second friction pad and is axially engaged with the second block for axial movement therewith, and a spring is disposed between the second friction pad and the first block, biasing the first block toward the second block.

6. A work fixture brake comprising:
    a first block having a first axis of rotation passing therethrough;
    a second block axially juxtaposed to the first block and pivotably connected to the first block at a second axis of rotation which is substantially parallel to and offset from the first axis of rotation;
    a brake disc functionally disposed between the first block and the second block;

a first friction pad fixed to the first block and on a first side of the brake disc and axially proximate to the brake disc;

a second friction pad connected to the second block and adapted for axial movement therewith on a second side of the brake disc opposite the first friction pad; and a pair of clutch cams disposed between the first block and the second block for axially displacing the first block from the second block responsive to a rotative force against the second block in a direction about the second axis of rotation thereby releasing the brake disc.

7. A work fixture brake as described in claim 6 wherein the cams are aligned on the second axis of rotation and a first clutch cam is fixed to the first block and the second clutch cam is fixed to the second block.

8. A work fixture brake as described in claim 7 wherein the cams each comprise a plurality of equally spaced peaks and valleys disposed on a predetermined diameter.

9. A work fixture brake as described in claim 7 wherein there are a plurality of cam rollers disposed between the cams.

10. A work fixture comprising:

a support frame having a rotatably mounted rotating shaft;

a first block fixed to the rotating shaft and having a first axis of rotation passing therethrough and having a first friction pad rotatively fixed thereto;

a second block axially juxtaposed the first block and pivotably connected thereto at a second axis or rotation substantially parallel to and offset from the first axis of rotation and having a second friction pad rotatively fixed thereto;

a brake disc fixed to the work frame having a first side facing the first friction pad and an oppositely disposed second side facing the second friction pad and being approximately centered on the first axis of rotation;

means for axially separating the first block from the second block disposed therebetween and the means being responsive to a rotative force against the second block in a direction which would induce rotation about the second axis of rotation thereby axially separating the first friction pad and the second friction pad and thereby releasing the brake disc.

* * * * *